United States Patent [19]
Covington

[11] 3,804,552
[45] Apr. 16, 1974

[54] FOUR BLADE MAIN ROTOR CONTROL POWER COUPLING

[75] Inventor: Cecil E. Covington, Hurst, Tex.

[73] Assignee: Textron Incorporated, Providence, R.I.

[22] Filed: July 5, 1972

[21] Appl. No.: 269,114

[52] U.S. Cl. .................. 416/134, 416/140, 416/148
[51] Int. Cl. ............................................ B64c 27/52
[58] Field of Search ............ 416/102, 148, 134, 140

[56] References Cited
UNITED STATES PATENTS

| | | | |
|---|---|---|---|
| 2,534,353 | 12/1950 | Hiller et al. | 416/102 X |
| 2,631,679 | 3/1953 | Hiller et al. | 416/102 X |
| 3,080,002 | 3/1963 | Du Pont | 416/102 |
| 3,087,690 | 4/1963 | Doman et al. | 416/102 |
| 3,231,222 | 1/1966 | Scheutzow | 416/134 X |
| 3,288,226 | 11/1966 | Lemont et al. | 416/102 |
| 3,378,083 | 4/1968 | Lichten et al. | 416/134 X |
| 2,633,925 | 4/1953 | Bates | 416/102 |
| 2,742,098 | 4/1956 | Jovanovich | 416/140 |
| 2,928,478 | 3/1960 | Du Pont | 416/140 |
| 2,949,965 | 8/1960 | De Tore et al. | 416/114 |

FOREIGN PATENTS OR APPLICATIONS

| | | | |
|---|---|---|---|
| 1,172,254 | 10/1958 | France | 416/102 |
| 521,840 | 2/1956 | Canada | 416/140 |
| 888,158 | 8/1943 | France | 416/114 |

Primary Examiner—Everette A. Powell, Jr.
Attorney, Agent, or Firm—Richards, Harris & Medlock

[57] ABSTRACT

Helicopters traveling in level flight are considered to be operating in a one "g" condition; that is, the rotor is producing lift equal to the vehicle weight. In a helicopter equipped with a gimbaled, teetering rotor, which cannot transmit a rotor moment into the mast head, a control moment about the aircraft center of gravity, a requirement to command a change in aircraft attitude, is obtained by tilting the rotor and hence its thrust vector. Thus, the control moment is a function of rotor thrust and tilt angle. When such an aircraft is subjected to a sudden descending maneuver, the rotor thrust will be reduced toward a zero or negative "g" condition. Consequently, the control moment capability will be reduced to zero and the aircraft becomes uncontrollable. However, the rotor is capable of producing a moment, if cyclic pitch is introduced to the rotor through a normal helicopter control system. This moment may be transmitted across a gimbal, down the supporting rotor mast to exert a controlling moment about the helicopter center of gravity by means of an elastomeric hub spring, connecting the gimbaled rotor hub to the rotor mast. This spring attaches to a first flange as part of the rotor hub yoke, and a second flange bolted to the supporting mast.

14 Claims, 4 Drawing Figures

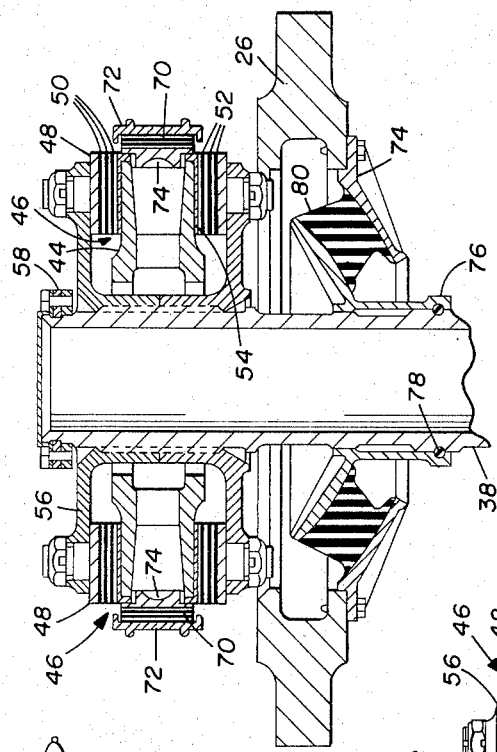
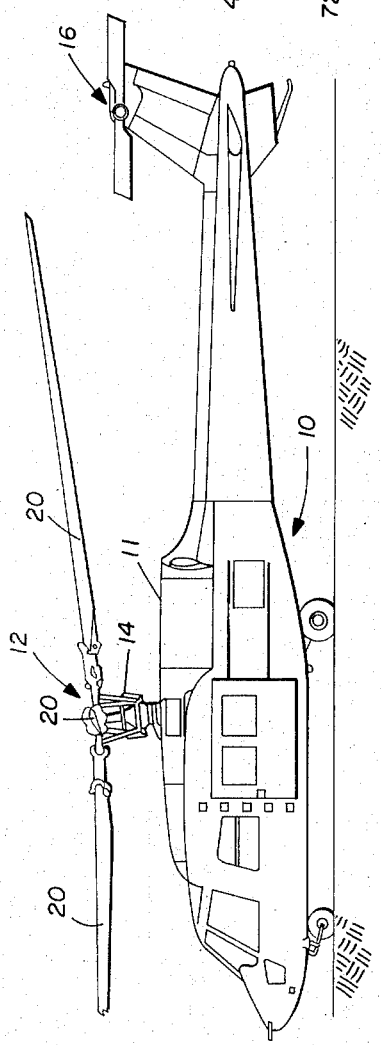
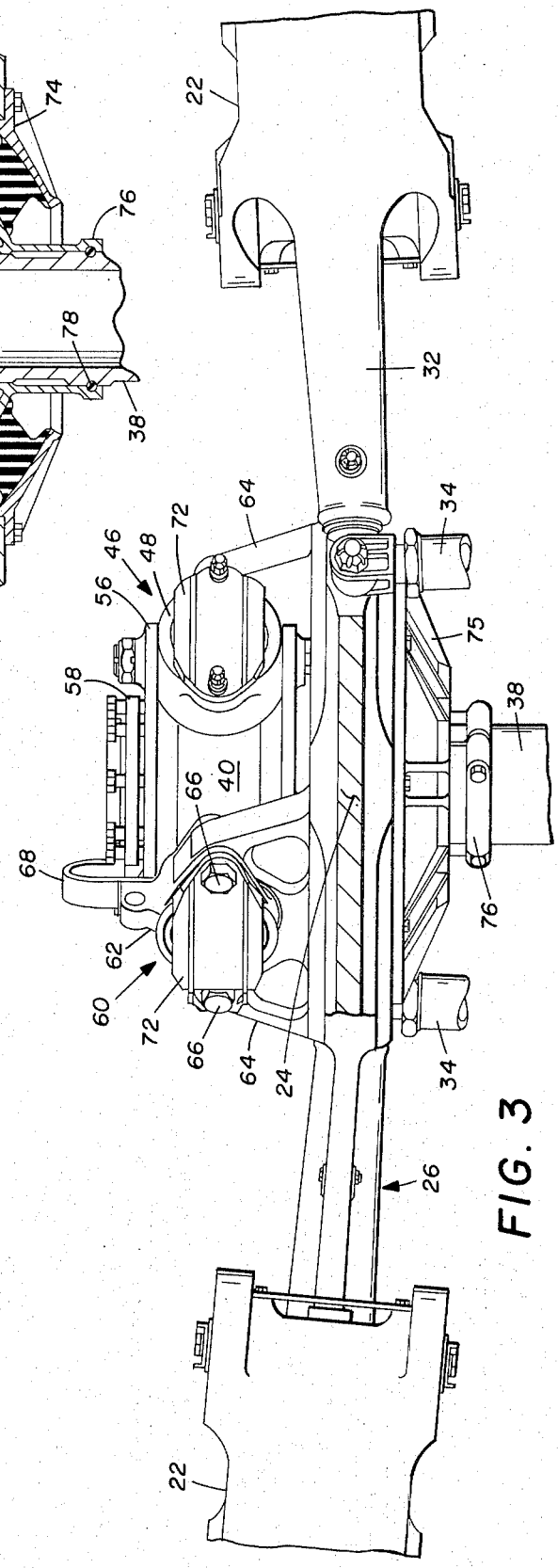

FOUR BLADE MAIN ROTOR CONTROL POWER COUPLING

This invention relates to a rotor blade mounting for a teetering main rotor assembly, and more particularly to a rotor blade mounting for transferring a cyclic pitch produced turning moment from a main rotor assembly to a supporting mast under zero G conditions.

When a helicopter operates in any condition where positive G forces are being exerted on the fuselage, thrust vector tilt produced by pitch control of the main rotor assembly causes a horizontal shear load component of the thrust produced by the rotor assembly to be transmitted to the supporting mast to provide power control of fuselage attitude. As a result, the fuselage follows the plane of the rotor assembly. When operating under zero G conditions, where no rotor thrust is generated, a change in pitch of the rotor blade, which produces a change in attitude of the rotor assembly, does not produce a horizontal shear, and power control of fuselage attitude is absent. Heretofore, to couple a torque vector produced turning moment from the rotor assembly to the rotor mast under zero G conditions for a power control of aircraft attitude, a spring has been utilized as a coupling between the rotor assembly and the supporting mast.

A feature of the present invention is to provide power control of fuselage attitude for a helicopter when operating in a zero G condition. Another feature of the present invention is to provide a coupling for transmitting rotor assembly cyclic pitch produced turning moments to a supporting mast when a helicopter operates under zero G conditions. Still another feature of the present invention is to provide a resilient coupling between a rotor assembly and a supporting mast for transfer of turning moments from the rotor assembly to the supporting mast.

In accordance with the present invention, a rotor blade mounting for a teetering main rotor assembly includes a yoke having each of the rotor blades of the assembly attached thereto and rotatable therewith. A drive plate is attached to a rotating supporting mast and is interconnected to the yoke by a gimbal coupling; the gimbal coupling providing a flexible connection and having two degrees of freedom. To transfer torque forces from the rotor assembly to the supporting mast an elastomeric coupling is provided between the yoke and the mast.

In a more specific embodiment of the invention, a rotor blade mounting for a teetering main rotor assembly includes a yoke having each of the rotor blades of the assembly attached thereto and includes first and second bearing blocks as a part thereof. A drive plate is attached to a rotating mast and includes first and second bearing blocks as a part thereof. A gimbal coupling including first and second bearings for mounting to the bearing blocks of the drive plate provides a flexible connection by means of third and fourth bearings for mounting to the bearing blocks of the yoke. An elastomeric coupling including an elastomeric hub supported between a first flange connected to the supporting mast and a second flange as part of the yoke transfers torque forces from the rotor assembly to the rotating mast.

A more complete understanding of the invention and its advantages will be apparent from the specification and claims and from the accompanying drawings illustrative of the invention.

Referring to the drawings:

FIG. 1 is a pictorial view of a helicopter with a four blade, teetering main rotor assembly and a tail rotor assembly;

FIG. 3 is a side view of a gimbal coupling and an elastomeric torque coupling of the four blade assembly of FIG. 2; and FIG. 4 is a sectional view taken along the line 4—4 of FIG. 2 showing the elastomeric coupling and gimbal bearings.

Figure 2:
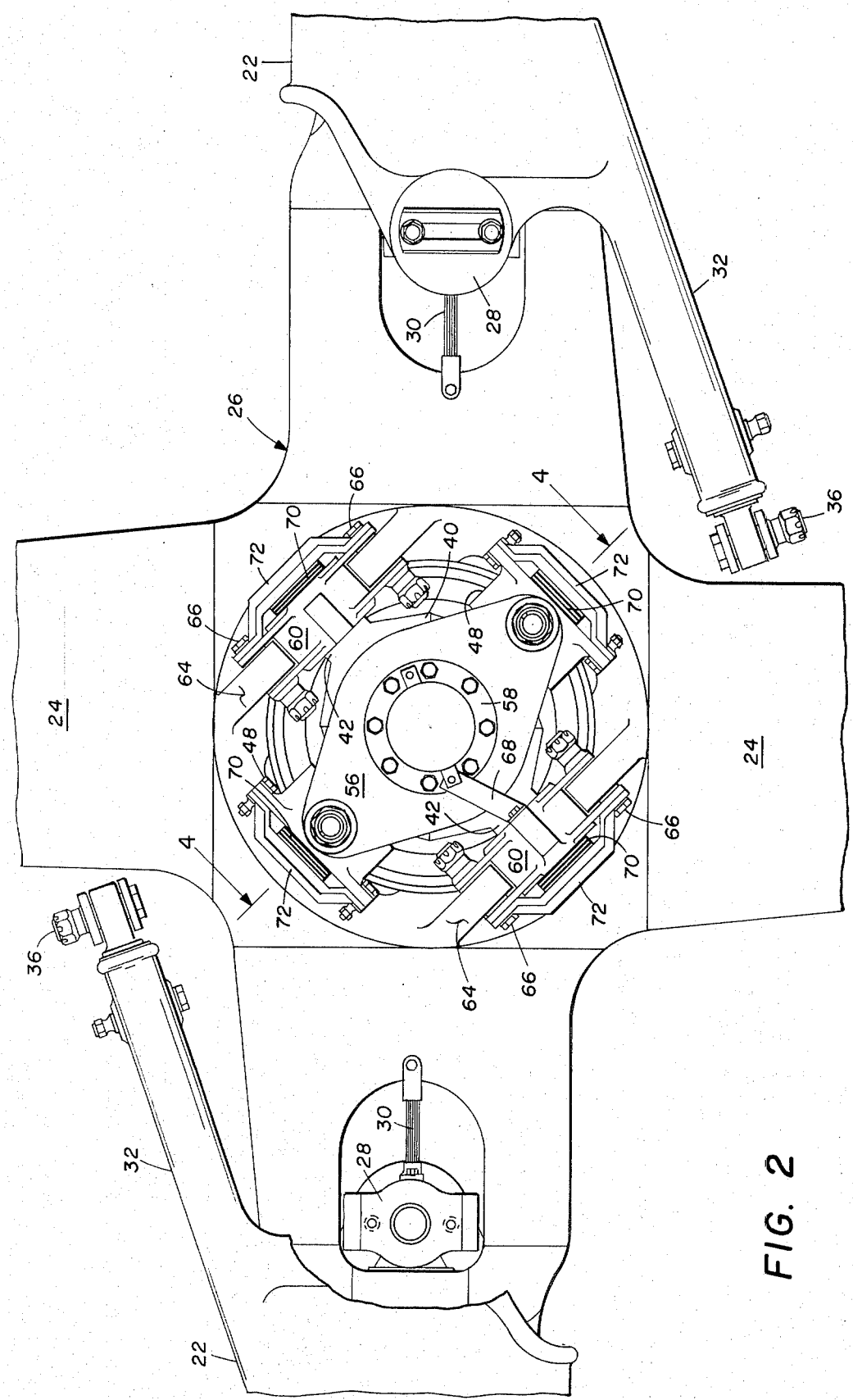
FIG. 2 is a plan view of a gimbal coupling between a rotating supporting mast and a rotor yoke for a four blade assembly.

Referring to FIG. 1, the helicopter shown comprises an elongated fuselage or hull 10 having a pylon 11 housing an engine and the associated gearing required to rotate a lifting main rotor assembly 12 about a vertical shaft 14. The tail portion includes an anti-torque tail rotor assembly 16 as required on single main rotor helicopter designs to provide in-flight stability and aircraft heading control, that is, control in yaw. A landing gear 18 is provided for supporting the helicopter.

Angular motions to which a helicopter is subject are pitch, roll and yaw, as in a standard fixed wing aircraft. To control a helicopter's flight path, a pilot operates a collective-pitch control stick to impart varying degrees of positive and negative pitch to each rotor blade 20 of the main rotor assembly 12. The thrust vector produced by the main rotor assembly 12 is increased by operating the collective-pitch control stick to increase the "bite" of all of the rotor blades as a unit. A pilot's operation of a cyclic-pitch control stick causes variations of the bite of the blade at different points in their cycle of rotation and is thus able to tilt the thrust vector to produce a pitching or rolling "moment."

To enable the pilot to vary the thrust vector produced by the main rotor assembly 12, each blade is equipped with flapping and feathering hinges. These hinges make it possible for the pilot to tilt the rotor assembly so that the direction of thrust is displaced from the helicopter's center of gravity, thereby producing the "moment," or turning force, that pitches or rolls the craft.

Under flight conditions where the fuselage is experiencing G forces of acceleration, the turning moment produced by the thrust vector of the rotor assembly 12 is coupled to the fuselage 10. This causes the fuselage to follow the plane of rotation of the rotor assembly 12 giving the pilot responsive attitude control of his aircraft. When flying in level flight or under conditions where there are zero G forces of gravitational acceleration on the fuselage 10, a turning moment cannot be produced by a change in the attitude of the rotor assembly 12 because the rotor thrust is zero. This produces a nonresponsive attitude control for the aircraft with the result of an extremely long reaction time for the helicopter to respond to a change in attitude control, or a loss of attitude control.

To provide more responsive control in attitude, the present invention contemplates coupling the turning moment produced by a change in the attitude of the rotor assembly 12 to the vertical shaft 14. This turning moment is then transmitted from the vertical shaft 14 to the fuselage 10 for responsive attitude control.

Basically, a rotor blade 20 of the assembly 12 is mounted to a yoke by means of a blade grip wherein the yoke and blade grip are interconnected by means of elastomeric pitch change bearings arranged along the longitudinal axis of the blade grip. These elastomeric couplings enable the individual rotor blades to be adjusted in pitch to vary the "bite" of the blade as it rotates about the vertical shaft 14. An elastomeric thrust pad is provided intermediate between the two pitch change bearings, also positioned along the longitudinal axis of the blade grip.

Referring to FIGS. 2–4, the rotor blades 20 (not shown in FIGS. 2–4) are mounted to blade grips 22 at the outboard end thereof. For a four bladed main rotor assembly 12, blade grips 22 are also provided at points 24 of the rotor yoke 26. Each of the blade grips 22 is coupled to the yoke 26 by means of an inboard elastomeric pitch change bearing 28 and a similar outboard bearing (not shown). A grounding strap 30 provides a current path between each of the blade grips 22 and the yoke 26. For pitch control, each of the blade grips 22 includes a pitch arm 32 coupled to a pitch link 34 by means of a pitch horn clevis 36. On a four bladed main rotor assembly, there are four pitch links 34 all coupled to a swashplate for collective and cyclic pitch control of a rotor blade.

As explained, each of the blade grips is mounted to a rotor yoke 26 that is drivingly coupled to a supporting mast 38. To enable a pilot to change the magnitude and direction of the thrust vector of the main rotor assembly 12 by means of pitch control of the blades 20, the yoke 26 is coupled to the supporting mast 38 by means of a gimbal coupling having a cross member 40 with extending bearing surfaces 42 and 44. The bearing surfaces 42 are at right angles to the bearing surfaces 44.

Each of the bearing surfaces 44 supports an elastomeric drive bearing 46 in a pillow block bearing shell 48. The bearings 46 are constructed of alternate rings of an elastomeric material, such as rubber or similar material, interleaved with metallic rings. Overall construction of each of the bearings 46 provides a cylindrical configuration of laminated, elastomeric elements 50 interleaved with metallic elements 52. The inner race 54 of the bearings 46 is press fit or otherwise secured to a bearing surface 44. The pillow block bearing shell 48 is bolted or otherwise attached to a drive plate 56 keyed to rotate with the supporting mast 38. A retaining ring 58 is bolted to a top end of the supporting mast 38 and holds the drive plate 56 in place.

Each of the bearing surfaces 42 supports an elastomeric drive bearing 60 consisting of cylindrical shaped elastomeric elements interleaved with metallic elements to form a laminated structure as illustrated for the bearings 46. The outer surface of each of the bearings 60 is encased within a bearing shell 62 that is bolted to pillow blocks 64 by means of bolts 66. As best illustrated in FIG. 3, the pillow blocks 64 are formed integral with the upper surface of the yoke 26. An inner race (not shown) of each of the bearings 60 is press fit or otherwise secured to the bearing surface 42 of the drive plate 40. To prevent an electrical charge buildup in the main rotor assembly 12, a grounding strap 68 is connected between a pillow block 62 and the drive plate 56.

With the bearings 46 and 60 each assembled onto a bearing surface of the cross member 40 and respectively connected to the drive plate 56 and the pillow blocks 64, power delivered to the supporting mast 38 by an engine within the pylon 11 is transmitted to the rotor blades 20 through the yoke 26. As illustrated, the gimbal couplings of FIGS. 2–4 provide a teetering type action to the main rotor assembly 12.

To absorb thrust loads produced by centrifugal forces in the main rotor assembly 12, each of the bearing surfaces 42 and 44 is capped with an elastomeric thrust bearing 70. The thrust bearings 70 consist of alternate layers of circular discs of elastomeric elements interleaved with metallic elements. The result is a disc shaped, laminated, elastomeric bearing. Each of the bearings 70 is held in place by means of a thrust plate 72 bolted or otherwise secured to the pillow block bearing shells 48 or 62. As illustrated in FIG. 4 for the bearing surfaces 44, the inner element of each of the bearings 70 is coupled to the cross member 40 by means of a bearing shoe 74. Similar bearing shoes are provided at the outboard end of the bearing surfaces 42.

By controlling movement of the pitch links 34 a pilot may vary the bite of each of the rotor blades 20 through the pitch arm 32 as part of the blade grip 22. By selective adjustment of the blade pitch for each of the rotor blades 20, the magnitude and direction of the thrust vector of the main rotor assembly 12 may be varied to produce a turning moment for control of the attitude of the fuselage 10. To couple this turning moment from the main rotor assembly 12 to the fuselage 10 under zero G conditions, the rotor yoke 26 is coupled to the supporting mast 38 through an elastomeric coupling.

As best illustrated in FIGS. 3 and 4, this elastomeric coupling includes a first flange 75 bolted to the lower surface of the yoke 26 and a second flange 76 bolted to the mast 38. The flange 75 includes an inboard ring to provide a flapping stop for the rotor assembly 12. In addition to bolting to the mast 38, the flange 76 is located by means of a positioning ring 78 and in addition is keyed to the mast. Between the flange 75 and the flange 76 there is an elastomeric hub bearing 80 secured in place to opposite surfaces of the respective flanges. The elastomeric hub bearing 80 may be of a rubber material or similar elastomeric substance.

As a pilot varies the pitch of the rotor blades 20 and in turn the tilt of a main rotor assembly 12 with respect to the supporting mast 38, the turning moment produced by the rotor assembly tilt is transmitted to the mast 38 through the elastomeric hub bearing 80. Because of its resilient nature, the hub bearing 80 permits the tilting action of the main rotor assembly with respect to the supporting mast 38 and also transmits the turning moment between the yoke 26 and the mast. Transmission of this turning moment to the mast 38 causes the attitude of the fuselage 10 to follow the tilt of the main rotor assembly 12 for responsive helicopter control.

Rotating forces are not transmitted through the elastomeric hub bearing 80, again because of its flexible nature. These forces are transmitted between the rotating mast 38 and the yoke 26 by means of the gimbal coupling described.

While only one embodiment of the invention, together with modifications thereof, has been described in detail herein and shown in the accompanying drawings, it will be evident that various further modifications are possible without departing from the scope of the invention.

What is claimed is:

1. A rotor blade mounting for a teetering main rotor assembly, comprising in combination:
   a yoke having each of the rotor blades of the assembly attached thereto and rotatable therewith,
   a drive plate attached to a rotating support mast,
   a gimbal coupling for flexibly connecting said yoke to said drive plate with multiple degrees of freedom,
   a first annular shaped bearing support attached at the outer diameter to said yoke and extending inwardly to the support mast,
   a second annular shaped bearing support attached at the inner diameter to and rotatable with said mast and extending outwardly to said yoke in an overlapping configuration with the first flange, and
   an elastomeric hub bearing mounted between said first and second bearing supports for transferring a turning moment from the rotor assembly to the rotating mast.

2. A rotor blade mounting for a teetering main rotor assembly as set forth in claim 1 wherein said elastomeric coupling means includes:
   a first flange attached to said yoke,
   a second flange attached to and rotatable with said mast, and
   an elastomeric hub bearing supported between said first and second flanges for transferring a turning moment from the rotor assembly to the rotating mast.

3. A rotor blade mounting for a teetering main rotor assembly as set forth in claim 1 including a flapping stop for restricting the teetering movement of the rotor assembly with respect to the mast.

4. A rotor blade mounting for a teetering main rotor assembly as set forth in claim 1 wherein said gimbal coupling includes thrust bearing means to yieldably restrain movement of the rotor assembly in a direction along an axis transverse the longitudinal axis of the supporting mast.

5. A rotor blade mounting for a teetering main rotor assembly, comprising in combination:
   a yoke having each of the rotor blades of the assembly attached thereto and including first and second bearing blocks as a part thereof,
   a drive plate attached to a rotating mast and including first and second bearing blocks as a part thereof,
   a gimbal coupling including first and second bearings for mounting to the bearing blocks of said drive plate and third and fourth bearings for mounting to the bearing blocks of said yoke,
   a first annular shaped bearing support attached at the outer diameter of said yoke and extending inwardly to the support mast,
   a second annular shaped bearing support attached at the inner diameter to and rotatable with said mast and extending outwardly to said yoke in an overlapping configuration with the first flange, and
   an elastomeric hub bearing mounted between said first and second bearing supports for transferring a turning moment from the rotor assembly to the rotating mast.

6. A rotor blade mounting for a teetering main rotor assembly as set forth in claim 5 wherein said gimbal coupling includes a cross member having four extending bearing surfaces for individually supporting one of the four bearings.

7. A rotor blade mounting for a teetering main rotor assembly as set forth in claim 6 wherein each of said bearings includes cylindrical, laminated, elastomeric elements having an inner race supported on the bearing surface of said cross member and an outer circumference surface in a respective bearing block.

8. A rotor blade mounting for a teetering main rotor assembly as set forth in claim 5 including an elastomeric thrust bearing at each of the bearing blocks to yieldably restrain movement of the rotor assembly in a direction along an axis transverse the longitudinal axis of the supporting mast.

9. A rotor blade mounting for a teetering main rotor assembly as set forth in claim 5 including a flapping stop for restricting the teetering movement of the rotor assembly with respect to the mast.

10. A rotor blade mounting for a teetering main rotor assembly, comprising in combination:
    a yoke having each of the rotor blades of the assembly attached thereto and rotatable therewith and including first and second bearing blocks as a part thereof and a first annular shaped flange attached thereto at the outer diameter and extending to a rotating mast,
    a drive plate attached to the rotating mast and including first and second bearing blocks as a part thereof,
    a cross member having four extending bearing surfaces,
    first and second gimbal bearings supported on individual bearing surfaces of said cross member and mounted to the bearing blocks of said drive plate,
    third and fourth gimbal bearings supported on individual bearing surfaces of said cross member and mounted to the bearing blocks of said yoke,
    a second annular shaped flange attached at the inner diameter to and rotatable with said mast and extending outwardly to said yoke in an overlapping configuration with the first flange and
    an elastomeric hub bearing mounted between the first and second flanges for transferring a turning moment from the rotor assembly to the rotating mast.

11. A rotor blade mounting for a teetering main rotor assembly as set forth in claim 10 wherein each of said gimbal bearings includes cylindrical, laminated, elastomeric elements having an inner race supported on the bearing surface of said cross member and an outer circumference surface in a respective bearing block.

12. A rotor blade mounting for a teetering main rotor assembly as set forth in claim 10 including an elastomeric thrust bearing at each of the bearing blocks to yieldably restrain movement of the rotor assembly in a direction along an axis transverse to the longitudinal axis of the supporting mast.

13. A rotor blade mounting for a teetering main rotor assembly as set forth in claim 12 wherein each of said thrust bearings includes disc shaped, laminated, elastomeric elements having an inner element in contact with the outboard end of a bearing surface of said cross member, and
    including a thrust plate in contact with the outer element of each thrust bearing and attached to one of the bearing blocks.

14. A rotor blade mounting for a teetering main rotor assembly as set forth in claim 10 including a flapping stop for restricting the teetering movement of the rotor assembly with respect to the mast.

* * * * *